(12) United States Patent
Li et al.

(10) Patent No.: US 11,842,525 B2
(45) Date of Patent: Dec. 12, 2023

(54) METHOD FOR MEASURING THE SIMILARITY OF IMAGES/IMAGE BLOCKS

(71) Applicant: SHENZHEN UNIVERSITY, Shenzhen (CN)

(72) Inventors: Yanran Li, Shenzhen (CN); Zehong Zhao, Shenzhen (CN); Zexuan Zhu, Shenzhen (CN)

(73) Assignee: SHENZHEN UNIVERSITY

( * ) Notice: Subject to any disclaimer, the term of this patent is extended or adjusted under 35 U.S.C. 154(b) by 136 days.

(21) Appl. No.: 17/562,049

(22) Filed: Dec. 27, 2021

(65) Prior Publication Data

US 2022/0207854 A1 Jun. 30, 2022

(51) Int. Cl.
*G06T 7/77* (2017.01)
*G06T 7/00* (2017.01)
*G06V 10/42* (2022.01)
*G06V 20/17* (2022.01)
*G06V 10/56* (2022.01)

(52) U.S. Cl.
CPC .......... *G06V 10/431* (2022.01); *G06T 7/0002* (2013.01); *G06T 7/77* (2017.01); *G06V 10/56* (2022.01); *G06V 20/17* (2022.01); *G06T 2207/10028* (2013.01); *G06T 2207/10032* (2013.01); *G06T 2207/20076* (2013.01)

(58) Field of Classification Search
CPC ...... G06V 10/431; G06V 10/56; G06V 20/17; G06V 10/52; G06V 10/751; G06V 10/44; G06T 7/0002; G06T 7/77; G06T 2207/10028; G06T 2207/10032; G06T 2207/20076; G06T 2207/10024; G06T 2207/20021; G06T 2207/20064; G06T 5/005; G06T 7/00; G06F 18/22
USPC ........................................................ 382/154
See application file for complete search history.

(56) References Cited

U.S. PATENT DOCUMENTS

| | | | | |
|---|---|---|---|---|
| 2001/0043752 A1* | 11/2001 | Matsuura | ................ | G06T 9/007 382/248 |
| 2002/0191855 A1* | 12/2002 | Matsuura | ................ | G06T 9/007 382/240 |
| 2012/0243792 A1* | 9/2012 | Kostyukov | ............. | G06T 5/003 382/199 |
| 2014/0086479 A1* | 3/2014 | Luo | ........................... | G06T 5/10 382/156 |
| 2019/0387220 A1* | 12/2019 | Osmanis | ............... | H04N 13/183 |
| 2020/0132872 A1* | 4/2020 | Dossary | ................ | G01V 1/345 |

* cited by examiner

*Primary Examiner* — Ali Bayat

(57) ABSTRACT

The present application relates to a method for measuring the similarity of images/image blocks, which comprises: S1: acquiring two three-dimensional airspace images V and W; S2: decomposing the images V and W to obtain a plurality of sub-bands; S3: calculating a Laplacian probability corresponding to each high-frequency sub-band of V and W, weighting the high-frequency sub-hand; S4: marking two image blocks as X and Y, taking out data blocks corresponding to the image blocks X and Y, and calculating the statistics of the data blocks; S5: calculating the similarities of X and Y in each channel of each sub-band according to the statistics of the data blocks; S6: calculating an average value of the similarities of X and Y in each channel of each sub-band, and taking the average value as the similarity between X and Y.

10 Claims, 2 Drawing Sheets

METHOD FOR MEASURING THE SIMILARITY OF IMAGES/IMAGE BLOCKS

CROSS REFERENCE

The present application claims the priority to Chinese patent application No. 202011589813.0, entitled "Method for measuring the similarity of images/image blocks", filed on Dec. 28, 2020, the entire content of which is incorporated herein by reference.

TECHNICAL FIELD

The present application relates to the technical field of image processing, in particular to a computer-implemented method for measuring the similarity of images/image blocks.

BACKGROUND

Image inpainting by a computer is a technology to fill the missing areas of an image, and it pursues the natural and integrated repair result, which makes it impossible for the observer to distinguish the changed image contents or areas. Patch-Based Image Inpainting is such a kind of method in image inpainting that it divides the image into several image blocks with the same size (overlapping between image blocks is allowable), and performs image block matching, missing pixel filling and so on by taking image blocks as basic units, so as to achieve the purpose of image inpainting.

Image block matching is a key step in image inpainting based on image blocks. When matching of image blocks is carried out, if the similarity measurement performance of image blocks is poor, it is possible to match the wrong image blocks and till in the missing areas, which will further affect the subsequent image inpainting process and lead to obvious artifacts in the final restoration result.

In structural texture similarity metrics, a gray image is decomposed into several sub-bands by using steerable filter decomposition, and the corresponding statistics (a mean, a variance, a horizontal autocorrelation and a vertical autocorrelation) are calculated on each sub-band, and the similarity between the statistics of each sub-band of two images is calculated and taken as the similarity of the images.

At present, steerable filter decomposition is generally used to measure the similarity of images or image blocks. Steerable filter decomposition is used for feature decomposition of two-dimensional images. If it is applied to color images, each channel of color images needs to be decomposed separately. The process of image decomposition is pyramid style: when extracting features of multi-layer images, there is downsampling behavior, that is, the sub-band of the first layer has the same size as the original image, and the sub-band of the second layer has only ¼ of the original image, and so on. The biggest problem of steerable filter decomposition is that it can only decompose the features of gray images, but when it is applied to color images, the intrinsic correlation between channels will be ignored.

The existing similarity measures of image blocks are designed for two-dimensional images, such as directly calculating the Euclidean distance between image blocks, or using two-dimensional image feature extraction method to decompose the image and match the image blocks based on the extracted features. For color images, the existing methods regard each channel of the image as independent information, ignoring or not fully considering the intrinsic correlation of each channel of the color images.

SUMMARY

The present application provides a computer-implemented method for measuring the similarity between two images or two image blocks, so as to overcome the defect of low accuracy of similarity measurement of images/image blocks described in the prior art.

The method comprises the following steps:
S1: acquiring two three-dimensional airspace images, which are respectively marked as V and W;
S2: decomposing the three-dimensional airspace images V and W by using a three-dimensional tight frame to obtain a plurality of sub-bands, wherein the sub-bands comprise high-frequency sub-bands and low-frequency sub-bands;
S3: calculating a Laplacian probability corresponding to each high-frequency sub-band of V and W; using the Laplacian probability to weight the high-frequency sub-band, that is, using the Laplacian probability and corresponding channel information thereof for dot multiplication;
S4: marking two image blocks to be measured for similarity as X and Y, respectively taking out data blocks corresponding to the image blocks X and Y from each channel of the low-frequency and high-frequency sub-bands of V and W, and calculating the statistics of the data blocks;
S5: calculating the similarities of X and Y in each channel of each sub-band according to the statistics of the data blocks;
S6: calculating an average value of the similarities of X and Y in each channel of each sub-band, and taking the average value as the similarity between X and Y.

Further, the step S2 of decomposing the three-dimensional airspace images by using the three-dimensional tight frame specifically comprises:
when a first layer is decomposed, obtaining one low-frequency sub-band and thirteen high-frequency sub-bands;
for decomposition of a second layer or an $n^{th}$ layer, performing characteristic extraction based on the low-frequency sub-bands of the previous layer (the first layer or the $(n-1)^{th}$ layer), and obtaining one low-frequency sub-band and thirteen high-frequency sub-bands in each layer decomposition, i.e., when the three-dimensional airspace image is decomposed into n layers, one low-frequency sub-band and 13n high-frequency sub-bands can be obtained.

Further, a three-dimensional rectangular coordinate system is constructed in a three-dimensional space, with an X axis and a axis in the horizontal direction and a Z axis in the vertical direction, and thirteen high-frequency sub-bands are the characteristics of the three-dimensional airspace image in all directions: one high-frequency sub-band in each of the X, Y and Z directions, two high-frequency sub-bands in each of the XY, XZ and YZ directions, and four high-frequency sub-bands in the XYZ direction.

Further, the essence of decomposing the three-dimensional airspace image by using the three-dimensional tight frame is to extract hierarchical characteristics of every group of eight data points in the three-dimensional airspace image;

Eight data are taken as eight vertices of a cuboid, and there are four data points on the upper surface and the lower surface of the cuboid respectively, which come from two channels of the image respectively.

when decomposing the $n^{th}$ layer of the three-dimensional tight frame, the interval between two adjacent data points is $2^{n-1}-1$ pixels;

for each data point in the three-dimensional tight frame characteristic, according to the above interval requirements, eight data points can be obtained from the three-dimensional airspace image or the lower frequency sub-band of the upper layer, and calculated from the eight data points.

Further, the high-frequency sub-band contains the change of the airspace image or the low-frequency sub-band of the previous layer in all directions, which is the difference of every combination of two data points in every group of eight data points in the three-dimensional airspace image, and the gradient information of the image is captured;

while each point in the low-frequency sub-band is the average of every group of eight data points, and the low-frequency sub-band is fuzzy.

Further, the operation of calculating a Laplacian probability corresponding to each high-frequency sub-band is as below:

an image V is an RGB color image, and the two-dimensional resolution thereof is set as $n_1$ rows and $n_2$ columns, i.e., $V \in R^{n_1 \times n_2 \times 3}$;

an $i^{th}$ sub-band of the three-dimensional tight frame characteristics of the image V is represented by $V_i(V_i \in R^{n_1 \times n_2 \times 3})$, wherein $V_{i,j}(V_{i,j} \in R^{n_1 \times n_2})$ represents a j(j=1, 2, 3)$^{th}$ channel of $V_i$, and $V_{i,j}$ is stacked into a vector by column to obtain $v_{i,j}(v_{i,j} \in R^{n_1 n_2})$;

the mean value of $V_{i,j}$ is:

$$\mu_{V_{i,j}} = \frac{\sum_{k=1}^{n_1 n_2} v_{i,j}[k]}{n_1 n_2}$$

where, $v_{i,j}[k]$ indicates a $k^{th}$ element in $v_{i,j}$, and $n_1 n_2$ is the number points of $v_{i,j}$;

assuming that the data points in $V_{i,j}$ conforms to Laplace distribution, then the standard deviation of $V_{i,j}$ is:

$$\sigma_{V_{i,j}} = \sqrt{2} \cdot \frac{\sum_{k=1}^{n_1 n_2} |v_{i,j}[k] - \mu_{V_{i,j}}|}{n_1 n_2}$$

where, $|\cdot|$ represents an absolute value;

the standard deviation of $V_{i,j}$ is equal to $\sqrt{2}$ times of the average value of the absolute value of the midpoint of $V_{i,j}$ after centralization;

a standard deviation (a local standard deviation) of a $w_1 \times w_2$ window with a center being a point $V_{i,j}[m, n]$ in $V_{i,j}$:

$$\hat{\sigma}_{V_{i,j}}[m, n] = \sqrt{2} \cdot \sum_{\hat{m}=m-\lfloor w_1/2 \rfloor}^{\hat{m}=m+\lfloor w_1/2 \rfloor} \sum_{\hat{n}=n-\lfloor w_2/2 \rfloor}^{\hat{n}=n+\lfloor w_2/2 \rfloor} \frac{|V_{i,j}[\hat{m}, \hat{n}]|}{w_1 w_2}$$

where, $V_{i,j}[\hat{m}, \hat{n}]$ represents a point in an $\hat{m}^{th}$ row and an $\hat{n}^{th}$ column of $V_{i,j}$, $\hat{\sigma}_{V_{i,j}}$ is a standard deviation of each local window of $\hat{\sigma}_{V_{i,j}}$;

the local standard deviation is substituted into a Laplacian probability model, and the Laplacian probability of $V_{i,j}$ estimated as $P_{i,j}$:

$$P_{i,j}[m, n] = \frac{1}{\sqrt{2} \cdot \sigma_{V_{i,j}}} \exp\left(-\frac{\sqrt{2} \cdot |\hat{\sigma}_{V_{i,j}}[m, n] - \mu_{V_{i,j}}|}{\sigma_{V_{i,j}}}\right)$$

where, $P_{i,j}[m, n]$ is the point of an $m^{th}$ row and an $n^{th}$ column in $P_{i,j}$;

the Laplacian probability distribution of each channel of each sub-band of image W can be obtained in a similar way.

Further, the statistics of the data block in S4 comprises a mean, a variance, a horizontal autocorrelation and a vertical autocorrelation.

Further, the calculation methods of a mean, a variance, a horizontal autocorrelation and a vertical autocorrelation are as follows:

image V and W are RGB color images, and the resolutions of the two images are the same; let the two-dimensional resolutions of the images be $n_1$ rows and $n_2$ columns, i.e., $V, W \in R^{n_1 \times n_2 \times 3}$;

an $i^{th}$ sub-band of the three-dimensional tight frame characteristic of the image V is represented using $V_i(V_i \in R^{n_1 \times n_2 \times 3})$, and $V_{i,j}(V_{i,j} \in R^{n_1 \times n_2})$ represents the j(j=1,2,3)$^{th}$ channel of $V_i$;

an $i^{th}$ sub-band of the three-dimensional tight frame characteristic of the image W is represented using $W_i(W_i \in R^{n_1 \times n_2 \times 3})$, and $W_{i,j}(W_{i,j} \in R^{n_1 \times n_2})$ represents the j(j=1,2,3)$^{th}$ channel of $V_i$;

image blocks in a row $p_1$ and a column $p_2$ are taken out respectively from $V_{i,j}$ and $W_{i,j}$ and are recorded as $X_{i,j}(X_{i,j} \in R^{p_1 \times p_2})$ and $Y_{i,j}(Y_{i,j} \in R^{p_1 \times p_2})$ respectively, and $X_{i,j}$ and $Y_{i,j}$ are stacked into vectors by column to obtain $x_{i,j}$ and $y_{i,j}(x_{i,j}, y_{i,j} \in R^{p_1 p_2})$;

a mean value of the data block $X_{i,j}$ is:

$$\mu_{X_{i,j}} = \frac{\sum_{k=1}^{p_1 p_2} x_{i,j}[k]}{p_1 p_2}$$

where $x_{i,j}[k]$ represents the $k^{th}$ element in $x_{i,j}$; the mean value $\mu_{Y_{i,j}}$ of the data block $Y_{i,j}$ can be calculated in a similar way;

the variance of the data block $X_{i,j}$ is:

$$\mu^2_{X_{i,j}} = \frac{\sum_{k=1}^{p_1 p_2} (x_{i,j}[k] - \mu_{X_{i,j}})^2}{p_1 p_2}$$

the variance $\sigma_{Y_{i,j}}^2$ of the data block $Y_{i,j}$ can be calculated in a similar way;

the horizontal autocorrelation of the data block $X_{i,j}$ is:

$$\rho_{X_{i,j}}(0,1) = \frac{\mathbb{E}\{(X_{i,j}[m, n] - \mu_{X_{i,j}})(X_{i,j}[m, n+1] - \mu_{X_{i,j}})\}}{\sigma^2_{X_{i,j}}}$$

$$= \frac{\sum_m \sum_n [(X_{i,j}[m, n] - \mu_{X_{i,j}})(X_{i,j}[m, n+1] - \mu_{X_{i,j}})]}{p_1(p_2 - 1) \cdot \sigma^2_{X_{i,j}}}$$

where $\mathbb{E}\{\cdot\}$ represents the calculation of expected value, and $X_{i,j}[m,n]$ represents the value of the $m^{th}$ row and the $n^{th}$ column in $X_{i,j}$;

the horizontal autocorrelation of $X_{i,j}$ is equal to the average value of the product of every two points in the left and right in $X_{i,j}$ after centralization, divided by the variance of $X_{i,j}$;

the vertical autocorrelation of the data block $X_{i,j}$ is:

$$\rho_{X_{i,j}(1,0)} = \frac{\mathbb{E}\{(X_{i,j}[m,n] - \mu_{X_{i,j}})(X_{i,j}[m+1,n] - \mu_{X_{i,j}})\}}{\sigma^2_{X_{i,j}}}$$

$$= \frac{\sum_m \sum_n [(X_{i,j}[m,n] - \mu_{X_{i,j}})(X_{i,j}[m+1,n] - \mu_{X_{i,j}})]}{(p_1 - 1)p_2 \cdot \sigma^2_{X_{i,j}}}$$

the vertical autocorrelation of $X_{i,j}$ is equal to the average value of the product of every two points in the upper and lower in $X_{i,j}$ after centralization, divided by the variance of $X_{i,j}$;

the horizontal autocorrelation $\rho_{Y_{i,j}(0,1)}$ and vertical autocorrelation $\rho_{Y_{i,j}(1,0)}$ of $Y_{i,j}$ can be calculated in a similar way.

Further, S5 is specifically as below: the similarity between the mean values of the data block $X_{i,j}$ and the data block $Y_{i,j}$ is:

$$s_{mean}(X_{i,j}, Y_{i,j}) = \frac{2\mu_{X_{i,j}}\mu_{Y_{i,j}} + c_1}{(\mu_{X_{i,j}})^2 + (\mu_{Y_{i,j}})^2 + c_1}$$

where, $c_1$ represents a small constant;
the similarity between the variances of the data block $X_{i,j}$ and the data block $Y_{i,j}$ is:

$$s_{var}(X_{i,j}, Y_{i,j}) = \frac{2\sigma_{X_{i,j}}\sigma_{Y_{i,j}} + c_2}{(\sigma_{X_{i,j}})^2 + (\sigma_{Y_{i,j}})^2 + c_2}$$

where, $c_2$ represents a small constant;
the similarity between the horizontal autocorrelations of the data block $X_{i,j}$ and the data block $Y_{i,j}$ is:

$$s_{hor}(X_{i,j}, Y_{i,j}) = 1 - 0.5(|\rho_{X_{i,j}(0,1)} - \rho_{Y_{i,j}(0,1)}|)$$

the similarity between the vertical autocorrelations of the data block $X_{i,j}$ and the data block $Y_{i,j}$ is:

$$s_{ver}(X_{i,j}, Y_{i,j}) = 1 - 0.5(|\rho_{X_{i,j}(1,0)} - \rho_{Y_{i,j}(1,0)}|)$$

where, $|\cdot|$ means to find an absolute value.
Further, the similarity between image blocks X and Y is:

$$sim(X, Y) = \frac{1}{\#I \cdot \#J} \sum_{i=1}^{\#I} \sum_{j=1}^{\#J} s_{mean}(X_{i,j}, Y_{i,j}) s_{var}(X_{i,j}, Y_{i,j}) s_{hor}(X_{i,j}, Y_{i,j}) s_{ver}(X_{i,j}, Y_{i,j})$$

where, #I is the number of sub-bands of the three-dimensional tight frame that is being used, and #J is the number of channels of each sub-band.

The method of measuring the similarity of two image blocks X and Y in two three-dimensional spatial images V and W has been described above. The above description includes the following situations:

1. If the three-dimensional airspace images V and W are the same image, what is actually measured is the similarity of two image blocks on the same three-dimensional spatial image.
2. If the three-dimensional airspace image V is taken as image block X and the image W is taken as image block Y, then the similarity between two three-dimensional airspace images is actually measured.

In addition, the following method can be used to calculate the similarity of two three-dimensional airspace images V and W: dividing the images V and W into several image blocks with the same size, calculating the similarity of images V and W on each corresponding image block respectively, and averaging the similarity of each image block as the similarity of the images V and W.

Compared with the prior art, the technical solution of the present application has the beneficial effects that the feature extraction of the color image is carried out by using a three-dimensional tight frame, and the intrinsic correlation among various channels is fully utilized. Using the extracted three-dimensional tight frame characteristics for image block matching can effectively improve the accuracy of image/image block similarity measurement and the quality of image inpainting.

DETAILED DESCRIPTION OF EMBODIMENTS

Figure 1:
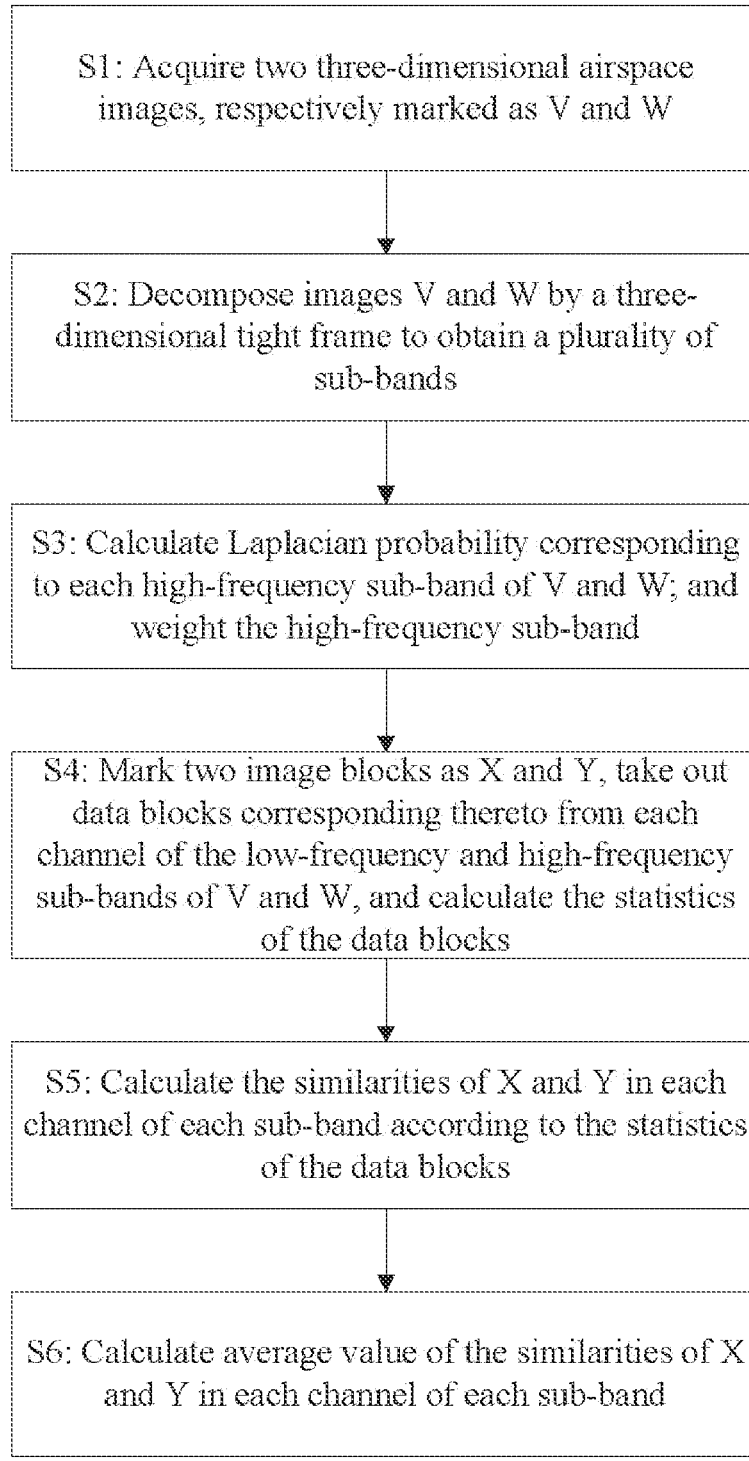
FIG. 1 is a flow chart of a method for measuring similarity of images/image blocks according to Example 1.

The drawings are for illustration only, and should not be construed as the limitation of this patent.
In order to better illustrate the present example, some parts in the drawings may be omitted, enlarged or reduced, and do not represent the actual product size.
For those skilled in the art, it should be appreciated that some well-known structures in the drawings and their descriptions may be omitted.
Next, the technical solution of the present application will be further explained with reference to the drawings and examples.

Example 1

This example provides a method for measuring the similarity of images/image blocks. As shown in FIG. 1, the method includes the following steps:
S1, acquiring two three-dimensional airspace images, which are respectively marked as V and W;
S2, decomposing the three-dimensional airspace images V and W by using a three-dimensional tight frame to obtain a plurality of sub-bands, wherein the sub-bands comprise high-frequency sub-bands and low-frequency sub-bands;
in the step of decomposing the three-dimensional airspace images by using the three-dimensional tight frame, when a first layer is decomposed, obtaining one low-frequency sub-band and thirteen high-frequency sub-bands, wherein thirteen high-frequency sub-hands are the characteristics of the three-dimensional airspace image in all directions: one high-frequency sub-band in each of the X, Y and Z directions, two high-frequency sub-bands in each of the XY, XZ and YZ directions, and 4 high-frequency sub-bands in the XYZ direction.
From decomposition of a second layer, characteristic extraction is performed based on the low-frequency sub-bands of the previous layer, and one low-frequency sub-band and thirteen high-frequency sub-bands are obtained in each layer decomposition, i.e., when the three-dimensional airspace image is decomposed into n layers, one low-frequency sub-band and 13n high-frequency sub-bands can be obtained.

Figure 2:
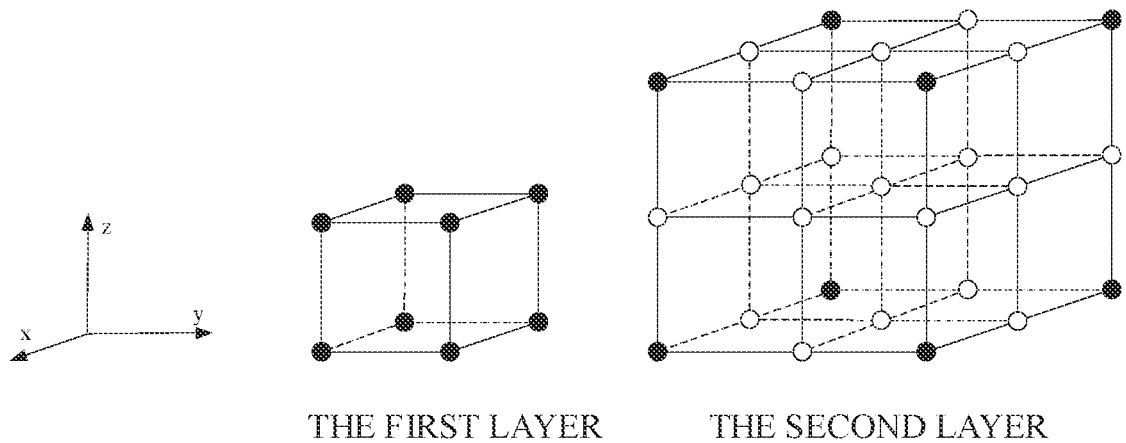
FIG. 2 is a schematic diagram of feature extraction of a three-dimensional tight frame.

As shown in FIG. 2, the essence of decomposing the three-dimensional airspace image by using the three-dimensional tight frame is to extract hierarchical characteristics of every eight data points in the three-dimensional airspace image; 8 data are taken as eight vertices of a cuboid, and there are four data points on the upper surface and the lower surface of the cuboid, which come from two channels of the image respectively; when decomposing the $n^{th}$ layer of the three-dimensional tight frame, the interval between adjacent data points is $2^{n-1}-1$ pixels.

For each data point in the three-dimensional tight frame characteristic, according to the above interval requirements, eight data points can be obtained from the three-dimensional airspace image or the lower frequency sub-band of the upper layer, and calculated from the 8 data points.

Figure 3:
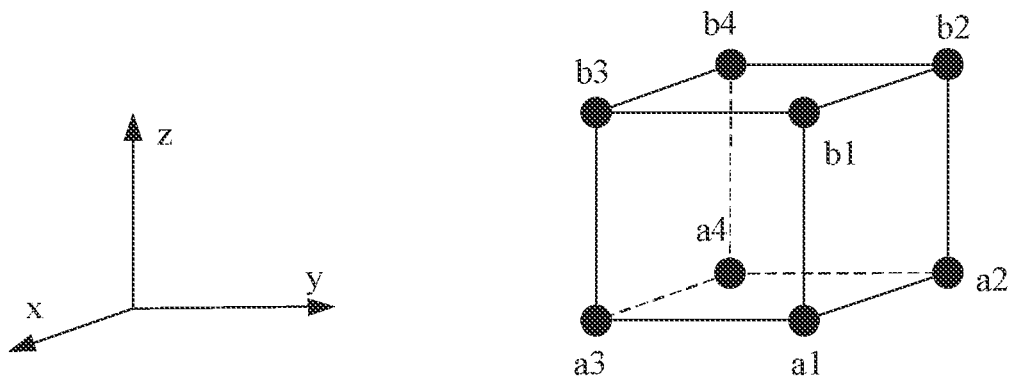
FIG. 3 is an example diagram of data points of a three-dimensional tight frame.

As shown in FIG. 3, taking point a1 as an example, the values corresponding to the positions of a1 in the low-frequency and high-frequency sub-bands are calculated, and it is necessary to obtain eight data points corresponding to a1 from the three-dimensional airspace image or the low-frequency sub-band of the upper layer: a1, a2, a3, a4, b1, b2, b3, b4, b5. The high-frequency and low-frequency information at a1 position is calculated as follows:

the high frequency information in X direction is: (a2−a1)/8;
the high frequency information in Y direction is: (a3−a1)/8;
the high frequency information in Z direction is: (b1−a1)/8;
the high frequency information in XY direction is (a4−a1)/8 and (a2−a3)/8
the high frequency information in XZ direction is (b2−a1)/8 and (a2−b1)/8;
the high frequency information in YZ direction is (b3−a1)/8 and (a3−b1)/8
the high frequency characteristics in XYZ direction are (b4−a1)/8, (a4−b1)/8, (b2−a3)/8 and (a2−b3)/8
the low frequency information is (a1+a2+a3+a4+b1+b2+b3+b4)/8.

S3, calculating a Laplacian probability corresponding to each high-frequency sub-band of V and W; using the Laplacian probability to weight the high-frequency sub-band, that is, using the Laplacian probability and corresponding channel information thereof for dot multiplication.

After feature extraction of a three-dimensional airspace image by a three-dimensional tight frame, one low-frequency sub-band and several high-frequency sub-bands will be obtained. Firstly, the Laplacian probability distribution of each channel of each high-frequency sub-band is calculated and the probability distribution and its corresponding channel information are used to weight, that is, the Laplacian probability is used to dot multiply the three-dimensional tight frame characteristics.

The operation of calculating a Laplacian probability corresponding to each high-frequency sub-band is as below:

an image V is an RGB color image, and the two-dimensional resolution thereof is set as $n_1$ rows and $n_2$ columns, i.e., $V \in R^{n_1 \times n_2 \times 3}$;
an sub-band of the three-dimensional tight frame characteristics of the image V is represented by $V_i(V_i \in R^{n_1 \times n_2 \times 3})$, wherein $V_{i,j}(V_{i,j} \in R^{n_1 \times n_2})$ represents a j(j=1, 2, 3)$^{th}$ channel of $V_i$, and $V_{i,j}$ is stacked into a vector by column to obtain $v_{i,j}(v_{i,j} \in R^{n_1 n_2})$;

the mean value of $V_{i,j}$ is:

$$\mu_{V_{i,j}} = \frac{\sum_{k=1}^{n_1 n_2} v_{i,j}[k]}{n_1 n_2}$$

where, $v_{i,j}[k]$ indicates a $k^{th}$ element in $v_{i,j}$, and $n_1 n_2$ is the number points of $v_{i,j}$;
assuming that the data points in $V_{i,j}$ conforms to Laplace distribution, then the standard deviation of $V_{i,j}$ is:

$$\sigma_{V_{i,j}} = \sqrt{2} \cdot \frac{\sum_{k=1}^{n_1 n_2} |v_{i,j}[k] - \mu_{V_{i,j}}|}{n_1 n_2}$$

where, |·| represents an absolute value;
the standard deviation of is equal to $V_{i,j}$ is equal to $\sqrt{2}$ times of the average value of the absolute value of the midpoint of $V_{i,j}$ after centralization;
a standard deviation (a local standard deviation) of a $w_1 \times w_2$ window with a center being a point $V_{i,j}[m, n]$ in $V_{i,j}$:

$$\hat{\sigma}_{V_{i,j}}[m, n] = \sqrt{2} \cdot \sum_{\hat{m}=m-\lfloor w_1/2 \rfloor}^{\hat{m}=m+\lfloor w_1/2 \rfloor} \sum_{\hat{n}=n-\lfloor w_2/2 \rfloor}^{\hat{n}=n+\lfloor w_2/2 \rfloor} \frac{|V_{i,j}[\hat{m}, \hat{n}]|}{w_1 w_2}$$

where, $V_{i,j}[\hat{m}, \hat{n}]$ represents a point in a $\hat{m}^{th}$ row and a $\hat{n}^{th}$ column of $V_{i,j}$, $\hat{\sigma}_{V_{i,j}}$ is a standard deviation of each local window of $\hat{\sigma}_{V_{i,j}}$;
the local standard deviation is substituted into a Laplacian probability model, and the Laplacian probability of $V_{i,j}$ is estimated as $P_{i,j}$;

$$P_{i,j}[m, n] = \frac{1}{\sqrt{2} \cdot \sigma_{V_{i,j}}} \exp\left(-\frac{\sqrt{2} \cdot |\hat{\sigma}_{V_{i,j}}[m, n] - \mu_{V_{i,j}}|}{\sigma_{V_{i,j}}}\right)$$

where, $P_{i,j}[m, n]$ is the point of an $m^{th}$ row and an $n^{th}$ column in $P_{i,j}$;
similarly, the Laplacian probability distribution of each channel of each sub-band of image W can be obtained.
S4: marking two image blocks to be measured for similarity as X and Y, respectively taking out data blocks corresponding to the image blocks X and Y from each channel of the low-frequency and high-frequency sub-bands of V and W, and calculating the statistics of the data blocks: a mean, a variance, a horizontal autocorrelation and a vertical autocorrelation.

The calculation methods of a mean, a variance, a horizontal autocorrelation and a vertical autocorrelation are as follows:
image V and W are RGB color images, and the resolutions of the two images are the same; let the two-dimensional resolutions of the images be $n_1$ rows and $n_2$ columns, i.e., $V, W \in R^{n_1 \times n_2 \times 3}$;
an $i^{th}$ sub-band of the three-dimensional tight frame characteristic of the image V is represented using $V_i(V_i \in R^{n_1 \times n_2 \times 3})$, and $V_{i,j}(V_{i,j} \in R^{n_1 \times n_2})$ represents the j(j=1,2,3)$^{th}$ channel of $V_i$;
an sub-band of the three-dimensional tight frame characteristic of the image W is represented using $W_i(W_i \in R^{n_1 \times n_2 \times 3})$, and $W_{i,j}(W_{i,j} \in R^{n_1 \times n_2})$ represents the j(j=1,2,3)$^{th}$ channel of $V_i$;

image blocks in a row $p_1$ and a column $p_2$ are taken out respectively from $V_{i,j}$ and $W_{i,j}$ and are recorded as $X_{i,j}(X_{i,j} \in R^{p_1 \times p_2})$ and $Y_{i,j}(Y_{i,j} \in R^{p_1 \times p_2})$ respectively, and $X_{i,j}$ and $Y_{i,j}$ are stacked into vectors by column to obtain $x_{i,j}$ and $y_{i,j}(x_{i,j}, y_{i,j} \in R^{p_1 p_2})$;
a mean value of the data block $X_{i,j}$ is:

$$\mu_{X_{i,j}} = \frac{\sum_{k=1}^{p_1 p_2} x_{i,j}[k]}{p_1 p_2}$$

where $x_{i,j}[k]$ represents the $k^{th}$ element in $x_{i,j}$; similarly, the mean value $\mu_{Y_{i,j}}$ of the data block $Y_{i,j}$ can be calculated;
the variance of the data block $X_{i,j}$ is:

$$\sigma_{X_{i,j}}^2 = \frac{\sum_{k=1}^{p_1 p_2} (x_{i,j}[k] - \mu_{X_{i,j}})^2}{p_1 p_2}$$

similarly, the variance $\sigma_{Y_{i,j}}^2$ of the data block $Y_{i,j}$ can be calculated;
the horizontal autocorrelation of the data block $X_{i,j}$ is:

$$\rho_{X_{i,j}(0,1)} = \frac{\mathbb{E}\{(X_{i,j}[m,n] - \mu_{X_{i,j}})(X_{i,j}[m,n+1] - \mu_{X_{i,j}})\}}{\sigma_{X_{i,j}}^2}$$

$$= \frac{\sum_m \sum_n [(X_{i,j}[m,n] - \mu_{X_{i,j}})(X_{i,j}[m,n+1] - \mu_{X_{i,j}})]}{p_1(p_2-1) \cdot \sigma_{X_{i,j}}^2}$$

where $\mathbb{E}\{\cdot\}$ represents the calculation of expected value, and $X_{i,j}[m, n]$ represents the value of the $m^{th}$ row and the $n^{th}$ column in $X_{i,j}$;
the horizontal autocorrelation of $X_{i,j}$ is equal to the average value of the product of every two points in the left and right in $X_{i,j}$ after centralization, divided by the variance of $X_{i,j}$;
the vertical autocorrelation of the data block $X_{i,j}$ is:

$$\rho_{X_{i,j}(1,0)} = \frac{\mathbb{E}\{(X_{i,j}[m,n] - \mu_{X_{i,j}})(X_{i,j}[m+1,n] - \mu_{X_{i,j}})\}}{\sigma_{X_{i,j}}^2}$$

$$= \frac{\sum_m \sum_n [(X_{i,j}[m,n] - \mu_{X_{i,j}})(X_{i,j}[m+1,n] - \mu_{X_{i,j}})]}{(p_1-1)p_2 \cdot \sigma_{X_{i,j}}^2}$$

the vertical autocorrelation of $X_{i,j}$ is equal to the average value of the product of every two points in the upper and lower in $X_{i,j}$ after centralization, divided by the variance of $X_{i,j}$;
similarly, the horizontal autocorrelation $\rho_{Y_{i,j}(0,1)}$ and vertical autocorrelation $\rho_{Y_{i,j}(1,0)}$ of $Y_{i,j}$ can be calculated.
S5: calculating the similarities of X and Y in each channel of each sub-band according to the statistics of the data blocks;
The similarities, i.e., mean similarity, variance similarity, horizontal autocorrelation similarity and vertical autocorrelation similarity, between the corresponding statistics of two image blocks on each sub-band channel are calculated, and these four similarities are multiplied to get the similarity of two image blocks on each channel.

The similarity between the mean values of the data block $X_{i,j}$ and the data block $Y_{i,j}$ is:

$$s_{mean}(X_{i,j}, Y_{i,j}) = \frac{2\mu_{X_{i,j}}\mu_{Y_{i,j}} + c_1}{(\mu_{X_{i,j}})^2 + (\mu_{Y_{i,j}})^2 + c_1}$$

where, $c_1$ represents a small constant;
the similarity between the variances of the data block $X_{i,j}$ and the data block $Y_{i,j}$ is:

$$s_{var}(X_{i,j}, Y_{i,j}) = \frac{2\sigma_{X_{i,j}}\sigma_{Y_{i,j}} + c_2}{(\sigma_{X_{i,j}})^2 + (\sigma_{Y_{i,j}})^2 + c_2}$$

where, $c_2$ represents a small constant;
the similarity between the horizontal autocorrelations of the data block $X_{i,j}$ and the data block $Y_{i,j}$ is:

$$s_{hor}(X_{i,j}, Y_{i,j}) = 1 - 0.5(|\rho_{X_{i,j}(0,1)} - \rho_{Y_{i,j}(0,1)}|)$$

the similarity between the vertical autocorrelations of the data block $X_{i,j}$ and the data block $Y_{i,j}$ is:

$$s_{ver}(X_{i,j}, Y_{i,j}) = 1 - 0.5(|\rho_{X_{i,j}(1,0)} - \rho_{Y_{i,j}(1,0)}|)$$

where, $|\cdot|$ means to find an absolute value.
S6: calculating an average value of the similarities of X and Y in each channel of each sub-band as the similarity between X and Y.
Then, the similarity of each channel is averaged to obtain the similarity of the final two image blocks.
The similarity between image blocks X and Y is:

$$sim(X, Y) = \frac{1}{\#I \#J} \sum_{i=1}^{\#I} \sum_{j=1}^{\#J} s_{mean}(X_{i,j}, Y_{i,j}) s_{var}(X_{i,j}, Y_{i,j}) s_{hor}(X_{i,j}, Y_{i,j}) s_{ver}(X_{i,j}, Y_{i,j})$$

where, #I is the number of sub-bands of the three-dimensional tight frame that is being used, and #J is the number of channels of each sub-band.
In this embodiment, a three-dimensional tight frame is used to extract three-dimensional features of color images, and statistics on three-dimensional features (such as a mean value, a variance, etc.) are calculated, and the similarity between images or image blocks in the statistics of the three-dimensional tight frame characteristics is calculated as the similarity between images or image blocks.
The three-dimensional tight frame characteristics make better use of the correlation information between each channel of color images, which is conducive to improving the accuracy of image block similarity measurement and ultimately improving the quality of image inpainting.
The terms used to describe the positional relationship in the drawings are only used for illustration, and should not be construed as a limitation of this patent.
It should be appreciated that, implementations of the method described in this specification can be implemented in other types of digital electronic circuitry, or in computer software, firmware, or hardware, including the structures disclosed in this specification and their structural equivalents, or in combinations of one or more of them.
Obviously, the above examples of the present application are only examples for clearly explaining the present application, and are not limitations on the embodiments of the present application. For those of ordinary skill in the field, other changes or changes in different forms can be made on the basis of the above description. It is not necessary and impossible to exhaust all the embodiments here. Any modification, equivalent substitution and improvement within the spirit and principle of the present application should be included within the scope of protection of the claims of the present application.

What is claimed is:

1. A computer-implemented method for measuring a similarity of images/image blocks, comprising the following steps:
S1: acquiring two three-dimensional airspace images, which are respectively marked as V and W;
S2: decomposing the three-dimensional airspace images V and W by using a three-dimensional tight frame to obtain a plurality of sub-bands, wherein the sub-bands comprise a plurality of high-frequency sub-bands and low-frequency sub-bands;
S3: calculating a Laplacian probability corresponding to each of the plurality of high-frequency sub-bands; using the Laplacian probability to weight each of the plurality of high-frequency sub-bands;
S4: marking two image blocks to be measured for similarity as X and Y, respectively taking out data blocks corresponding to the image blocks X and Y from each channel of the low-frequency and high-frequency sub-bands of three-dimensional airspace images V and W, and calculating statistics of the data blocks;
S5: calculating the similarities of image blocks X and Y in each channel of each sub-band according to the statistics of the data blocks;
S6: calculating an average value of the similarities of image blocks X and Y in each channel of each sub-band.

2. The method of claim 1, wherein the said decomposing the three-dimensional airspace images V and W by using a three-dimensional tight frame in step S2 comprises:
when a first layer is decomposed, obtaining a first low-frequency sub-band and thirteen high-frequency sub-bands; and
when a second layer is decomposed, performing characteristic extraction on the first low-frequency sub-band obtained from the first layer to obtain a second low-frequency sub-band and another thirteen high-frequency sub-bands.

3. The method of claim 2, wherein a three-dimensional rectangular coordinate system is constructed, with an X axis and a Y axis in the horizontal direction and a Z axis in the vertical direction, the thirteen high-frequency sub-bands in each layer have the characteristics of the three-dimensional airspace image in all directions: one high-frequency sub-band in each of the X, Y and Z directions, two high-frequency sub-bands in each of the ZY, XZ and YZ directions, and four high-frequency sub-bands in the XYZ direction.

4. The method of claim 3, wherein the decomposing the three-dimensional airspace images V and W by using a three-dimensional tight frame is to extract hierarchical characteristics of every group of eight data points in the three-dimensional airspace image;
wherein the eight data are taken as eight vertices of a cuboid, and there are four data points on an upper surface and a lower surface of the cuboid, which come from two channels of each of the images respectively;
when decomposing an $n^{th}$ layer by the three-dimensional tight frame, neighboring two data points have an interval of $2^{n-1}-1$ pixels;
for each data point in the three-dimensional tight frame characteristic, according to the above interval requirement, eight data points can be obtained from the three-dimensional airspace image or the lower frequency sub-band of the previous layer, and calculated from the eight data points.

5. The method of claim 4, wherein the high-frequency sub-band comprises the change of the airspace image or the low-frequency sub-band of the previous layer in all directions, which is the difference of every combination of two data points in every group of eight data points in the three-dimensional airspace image, and a gradient information of the image is captured;
while each point in the low-frequency sub-band is an average value of the group of eight data points, and the low-frequency sub-band is fuzzy.

6. The method of claim 5, wherein the operation of calculating a Laplacian probability corresponding to each high-frequency sub-band in step S3 comprises:
an image V is an RGB color image, and the two-dimensional resolution thereof is set as $n_1$ rows and $n_2$ columns, accordingly $V \in R^{n_1 \times n_2 \times 3}$;
an $i^{th}$ sub-band of the three-dimensional tight frame characteristics of the image V is represented by $V_i(V_i \in R^{n_1 \times n_2 \times 3})$, wherein $V_{i,j}(V_{i,j} \in R^{n_1 \times n_2})$ represents a $j^{th}$ (j=1, 2, 3) channel of $V_i$, and $V_{i,j}$ is stacked into a vector by column to obtain $v_{i,j}(v_{i,j} \in R^{n_1 n_2})$;
$V_{i,j}$ has a mean value of:

$$\mu_{V_{i,j}} = \frac{\sum_{k=1}^{n_1 n_2} v_{i,j}[k]}{n_1 n_2},$$

where, $V_{i,j}[k]$ indicates a $k^{th}$ element in $V_{i,j}$, and $n_1 n_2$ is the number points of $V_{i,j}$;
assuming that the data points in $V_{i,j}$ conforms to Laplace distribution, then the standard deviation of $V_{i,j}$ is:

$$\sigma_{V_{i,j}} = \sqrt{2} \cdot \frac{\sum_{k=1}^{n_1 n_2} |v_{i,j}[k] - \mu_{V_{i,j}}|}{n_1 n_2},$$

where, |·| represents an absolute value;
the standard deviation of $V_{i,j}$ is equal to $\sqrt{2}$ times of the average value of the absolute value of the midpoint of $V_{i,j}$ after centralization;
a standard deviation or a local standard deviation of a $w_1 \times w_2$ window with a center being a point $V_{i,j}[m,n]$ in $V_{i,j}$ is calculated:

$$\hat{\sigma}_{V_{i,j}}[m, n] = \sqrt{2} \cdot \sum_{\hat{m}=m-\lfloor w_1/2 \rfloor}^{\hat{m}=m+\lfloor w_1/2 \rfloor} \sum_{\hat{n}=n-\lfloor w_2/2 \rfloor}^{\hat{n}=n+\lfloor w_2/2 \rfloor} \frac{|V_{i,j}[\hat{m}, \hat{n}]|}{w_1 w_2},$$

where, $V_{i,j}[\hat{m},\hat{n}]$ represents a point in an $\hat{m}^{th}$ row and an $\hat{n}^{th}$ column of $V_{i,j}$, $\hat{\sigma}_{V_{i,j}}$ represents a standard deviation of each local window of $V_{i,j}$;
the local standard deviation is substituted into a Laplacian probability model, and the Laplacian probability of $V_{i,j}$ is estimated as $P_{i,j}$;

$$P_{i,j}[m,n] = \frac{1}{\sqrt{2} \cdot \sigma_{V_{i,j}}} \exp\left(-\frac{\sqrt{2} \cdot |\hat{\sigma}_{V_{i,j}}[m,n] - \mu_{V_{i,j}}|}{\sigma_{V_{i,j}}}\right),$$

where, $P_{i,j}[m,n]$ is the point of an $m^{th}$ row and an $n^{th}$ column in $P_{i,j}$;

similarly, the Laplacian probability distribution of each channel of each sub-band of image W can be obtained.

7. The method of claim 6, wherein the statistics of the data block in S4 comprise a mean, a variance, a horizontal autocorrelation and a vertical autocorrelation.

8. The method of claim 7, wherein the mean, variance, horizontal autocorrelation and vertical autocorrelation have following calculation methods:

images V and W are RGB color images, and they have same resolutions; the two-dimensional resolutions of the images are set to be $n_1$ rows and $n_2$ columns, i.e., $V, W \in R^{n_1 \times n_2 \times 3}$;

$V_i(V_i \in R^{n_1 \times n_2 \times 3})$ represents an $i^{th}$ sub-band of the three-dimensional tight frame characteristic of the image V, and $V_{i,j}(V_{i,j} \in R^{n_1 \times n_2})$ represents a $j^{th}$ (j=1, 2, 3) channel of $V_i$;

$W_i(W_i \in R^{n_1 \times n_2 \times 3})$ represents an $i^{th}$ sub-band of the three-dimensional tight frame characteristic of the image W, and $W_{i,j}$ ($W_{i,j} \in R^{n_1 \times n_2}$) represents a $j^{th}$ (j=1, 2, 3) channel of $V_i$;

image blocks in a row $p_1$ and a column $p_2$ are taken out from $V_{i,j}$ and $W_{i,j}$ and are recorded as $x_{i,j}(x_{i,j} \in R^{p_1 \times p_2})$ and $Y_{i,j}(Y_{i,j} \in R^{p_1 \times p_2})$ respectively, and $X_{i,j}$ and $Y_{i,j}$ are stacked into vectors by column to obtain $x_{i,j}$ and $y_{i,j}$ ($x_{i,j}, y_{i,j} \in R^{p_1 p_2}$);

the data block $X_{i,j}$ has a mean value of:

$$\mu_{X_{i,j}} = \frac{\sum_{k=1}^{p_1 p_2} x_{i,j}[k]}{p_1 p_2},$$

where $x_{i,j}[k]$ represents a $k^{th}$ element in $x_{i,j}$; similarly, the mean value $\mu_{Y_{i,j}}$ of the data block $Y_{i,j}$ can be calculated;

the data block $X_{i,j}$ has a variance of:

$$\sigma_{X_{i,j}}^2 = \frac{\sum_{k=1}^{p_1 p_2} (x_{i,j}[k] - \mu_{X_{i,j}})^2}{p_1 p_2},$$

the variance $\sigma_{Y_{i,j}}^2$ of the data block $Y_{i,j}$ can be calculated in a similar way;

the data block $X_{i,j}$ has a horizontal autocorrelation of:

$$\rho_{X_{i,j}(0,1)} = \frac{E\{(X_{i,j}[m,n] - \mu_{X_{i,j}})(X_{i,j}[m, n+1] - \mu_{X_{i,j}})\}}{\sigma_{X_{i,j}}^2}$$

$$= \frac{\sum_m \sum_n [(X_{i,j}[m,n] - \mu_{X_{i,j}})(X_{i,j}[m, n+1] - \mu_{X_{i,j}})]}{p_1(p_2 - 1) \cdot \sigma_{X_{i,j}}^2},$$

where $E\{\cdot\}$ represents the calculation of expected value, and $X_{i,j}[m,n]$ represents the value of the $m^{th}$ row and the $n^{th}$ column in $X_{i,j}$;

the horizontal autocorrelation of $X_{i,j}$ is equal to the average value of the product of every group of two points in the left and right in $X_{i,j}$ after centralization, divided by the variance of $X_{i,j}$;

the data block $X_{i,j}$ has a vertical autocorrelation of:

$$\rho_{X_{i,j}(1,0)} = \frac{E\{(X_{i,j}[m,n] - \mu_{X_{i,j}})(X_{i,j}[m+1, n] - \mu_{X_{i,j}})\}}{\sigma_{X_{i,j}}^2}$$

$$= \frac{\sum_m \sum_n [(X_{i,j}[m,n] - \mu_{X_{i,j}})(X_{i,j}[m+1, n] - \mu_{X_{i,j}})]}{(p_1 - 1)p_2 \cdot \sigma_{X_{i,j}}^2},$$

the vertical autocorrelation of $X_{i,j}$ is equal to the average value of the product of every group of two points in the upper and lower in $X_{i,j}$ after centralization, divided by the variance of $X_{i,j}$;

the horizontal autocorrelation $\rho_{Y_{i,j}(0,1)}$ and vertical autocorrelation $\rho_{Y_{i,j}(0,1)}$ of $Y_{i,j}$ can be calculated in a similar way.

9. The method of claim 8, wherein the step S5 is as below: the similarity between the mean values of the data block $X_{i,j}$ and the data block $Y_{i,j}$ is:

$$s_{mean}(X_{i,j}, Y_{i,j}) = \frac{2\mu_{X_{i,j}}\mu_{Y_{i,j}} + c_1}{(\mu_{X_{i,j}})^2 + (\mu_{Y_{i,j}})^2 + c_1},$$

where, $c_1$ represents a small constant;
the similarity between the variances of the data block X and the data block $Y_{i,j}$ is:

$$s_{var}(X_{i,j}, Y_{i,j}) = \frac{2\sigma_{X_{i,j}}\sigma_{Y_{i,j}} + c_2}{(\sigma_{X_{i,j}})^2 + (\sigma_{Y_{i,j}})^2 + c_2},$$

where, $c_2$ represents a small constant;
the similarity between the horizontal autocorrelations of the data block $X_{i,j}$ and the data block $Y_{i,j}$ is:

$$S_{hor}(X_{i,j}, Y_{i,j}) = 1 - 0.5(|\rho_{X_{i,j}(0,1)} - \rho_{Y_{i,j}(0,1)}|),$$

the similarity between the vertical autocorrelations of the data block $X_{i,j}$ and the data block $Y_{i,j}$ is:

$$S_{ver}(X_{i,j}, Y_{i,j}) = 1 - 0.5(|\rho_{X_{i,j}(1,0)} - \rho_{Y_{i,j}(1,0)}|),$$

where, $|\cdot|$ means to find an absolute value.

10. The method of claim 9, wherein the similarity between image blocks X and Y is:

$$sim(X, Y) =$$

$$\frac{1}{\#I \cdot \#J} \sum_{i=1}^{\#I} \sum_{j=1}^{\#J} s_{mean}(X_{i,j}, Y_{i,j}) s_{var}(X_{i,j}, Y_{i,j}) s_{hor}(X_{i,j}, Y_{i,j}) s_{ver}(X_{i,j}, Y_{i,j}),$$

where, #I represents a number of sub-bands of the three-dimensional tight frame that is being used, and #J represents a number of channels of each sub-band.

* * * * *